(No Model.)
T. FITZGIBBON.
COMBINED REEL SUPPORT AND WIRE STRETCHER.
No. 492,000. Patented Feb. 21, 1893.
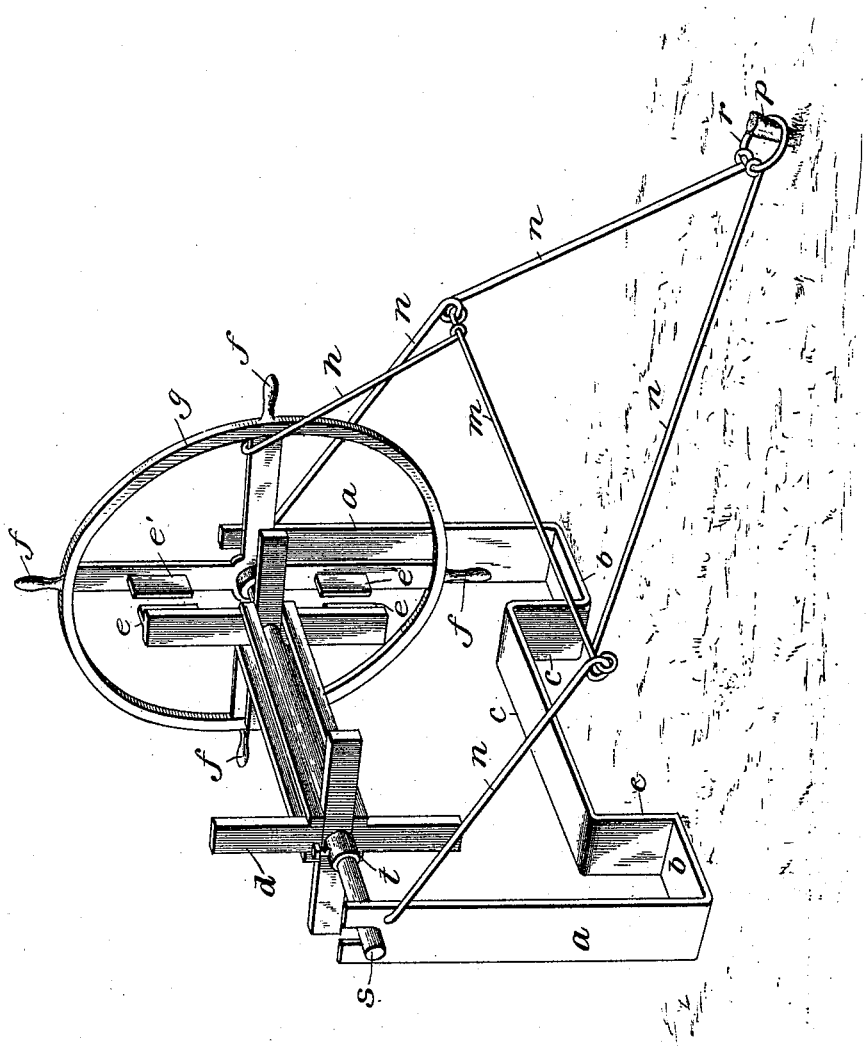
Witnesses
Edwin L. Bradford
Frank H. Thatcher
Inventor
Thomas Fitzgibbon
By Patrick O'Farrell
Attorney

UNITED STATES PATENT OFFICE.

THOMAS FITZGIBBON, OF GROVE CENTRE, KENTUCKY.

COMBINED REEL-SUPPORT AND WIRE-STRETCHER.

SPECIFICATION forming part of Letters Patent No. 492,000, dated February 21, 1893.

Application filed March 8, 1892. Serial No. 424,160. (No model.)

*To all whom it may concern:*

Be it known that I, THOMAS FITZGIBBON, a citizen of the United States of America, residing at Grove Centre, in the county of Union and State of Kentucky, have invented certain new and useful Improvements in a Combined Reel-Support and Wire-Stretcher, of which the following is a specification, reference being had therein to the accompanying drawing.

My invention relates to machines for reeling and stretching wire.

The object of my invention is to provide a simple and cheap reel support; and one adapted in form to stand upon uneven ground or to be attached to a sled.

In the drawing forming a part of this specification the illustration is a perspective view showing one of my improved reel supports as it will appear when set up in the field.

Referring to the drawing *a a* indicates supports formed integral with a sill *b*, having an angular portion *c c c*, the object of which is to adapt it to be set upon uneven surfaces and to fit the fenders or benches of a sled, the upper ends of the supports *a a* being slotted to form bearings for the shaft *s*, upon which there is fitted a spool *d* adapted to adjustment lengthwise of the shaft by setting the collar *t* at the desired point, the collar being provided with a binding screw for holding it in place. To one end of the spool are attached coupling blocks *e*, which co-operate with similar projections *e'* on the wheel *g*.

*f f*, indicate handles for turning the wheel; *h* indicating a hook to retain it at a given point when the wire is sufficiently taut.

*n n*, indicate rods connecting with the supports *a a* at one end and with the ring *r* at the other, by which the machine may be anchored in any part of the field by means of a pin *p*, which is driven into the ground at a proper angle to prevent the ring from slipping off.

*m*, indicates a brace for keeping the rods parallel to each other until they have advanced a given distance beyond the wheel when they are converged so as to connect with the ring *r*.

It will be seen that if this machine is properly secured to the benches or fenders of a sled and the spool *d* be filled with wire, the outer or free end of which is attached to one of a series of posts and the sled be then driven along the line the wire can be stretched and attached to the several posts, the wheel *g* being secured by the hook *h* after the wire has been stretched and while attaching it, the hook being disengaged from the wheel while driving to allow the wire to reel off, but connected again when the wire has been stretched to hold it taut while being fastened. To remove wire from a fence and place it upon the reel it is only necessary to reverse this operation.

This machine may be used either with or without a sled, and while I prefer attaching it to such a vehicle, I have not shown it as so attached, the sled forming no part of said invention.

Having thus described my invention, what I claim as new, and desire to secure by Letters Patent, is—

In a machine for reeling and stretching wire, a sill having a rectangular recess and upward extending arms adapted to form journal bearings, a shaft journaled in said arms, a spool movable on said shaft a collar and binding screw for adjusting said spool, a wheel with radial handles rigidly attached to said shaft, a clutch for connecting the wheel and spool, anchor rods extending from the arms to a support, a connecting ring and a brace attached to said anchor rods, substantially as described.

In testimony whereof I affix my signature in presence of two witnesses.

THOMAS FITZGIBBON.

Witnesses:
HAMILTON WALL,
JAS. R. HUGHES.